United States Patent
Poirot-Crouvezier

(10) Patent No.: US 11,600,833 B2
(45) Date of Patent: Mar. 7, 2023

(54) STACK OF ELECTROCHEMICAL CELLS DIVIDED UP INTO SEPARATE GROUPS COMPRISING A HOMOGENIZATION COMPARTMENT

(71) Applicant: COMMISSARIAT A L'ENERGIE ATOMIQUE ET AUX ENERGIES ALTERNATIVES, Paris (FR)

(72) Inventor: Jean-Philippe Poirot-Crouvezier, Saint Georges de Commiers (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 241 days.

(21) Appl. No.: 15/240,371

(22) Filed: Aug. 18, 2016

(65) Prior Publication Data
US 2017/0062849 A1 Mar. 2, 2017

(30) Foreign Application Priority Data

Aug. 26, 2015 (FR) ...................................... 15 57941

(51) Int. Cl.
*H01M 8/04* (2016.01)
*H01M 4/64* (2006.01)
(Continued)

(52) U.S. Cl.
CPC ........... *H01M 8/04201* (2013.01); *C25B 9/70* (2021.01); *H01M 8/0258* (2013.01);
(Continued)

(58) Field of Classification Search
None
See application file for complete search history.

(56) References Cited

U.S. PATENT DOCUMENTS 6,015,633 A 1/2000 Carlstrom, Jr. et al.
7,749,636 B2 * 7/2010 Scherer ................ H01M 8/028
429/469

(Continued)

FOREIGN PATENT DOCUMENTS

EP 1 672 726 A2 6/2006
FR 3 016 243 A1 7/2015
(Continued)

OTHER PUBLICATIONS

French Preliminary Search Report (with Written Opinion) dated Feb. 3, 2016 in French Application 15 57941 filed on Aug. 26, 2015 (with English Translation of Categories of Cited Documents).
(Continued)

*Primary Examiner* — Cynthia H Kelly
*Assistant Examiner* — Julian Anthony
(74) *Attorney, Agent, or Firm* — Oblon, McClelland, Maier & Neustadt, L.L.P.

(57) ABSTRACT

The invention relates to a stack of electrochemical cells (10A, 10B), divided up into at least two groups (A, B), each cell comprising a distribution circuit for a reactive species, and each group of cells comprising a separate supply collector (2A; 2B). At least one cell (10B) comprises a homogenization compartment (60B) comprising: a plurality of longitudinal conduits (61B) designed to receive the flow of the reactive species coming from the supply collector (2B) of the corresponding group and to distribute it over the inlet (51B) of the distribution circuit for the cell; and, a transverse conduit (62B) for homogenization connecting the longitudinal conduits (61B) to one another in a fluid sense.

20 Claims, 7 Drawing Sheets

(51) Int. Cl.
    *H01M 8/04082* (2016.01)
    *H01M 8/04089* (2016.01)
    *H01M 8/0258* (2016.01)
    *C25B 9/70* (2021.01)
    *H01M 8/2418* (2016.01)
    *H01M 8/0271* (2016.01)
    *H01M 8/00* (2016.01)
    *H01M 8/0297* (2016.01)
    *H01M 4/86* (2006.01)

(52) U.S. Cl.
    CPC ..... *H01M 8/0271* (2013.01); *H01M 8/04089* (2013.01); *H01M 8/2418* (2016.02); *H01M 8/006* (2013.01); *H01M 8/0297* (2013.01); *H01M 2004/8694* (2013.01)

(56) References Cited

U.S. PATENT DOCUMENTS

| | | | |
|---|---|---|---|
| 9,685,664 B2 * | 6/2017 | Nagumo | H01M 8/0254 |
| 2003/0215694 A1 | 11/2003 | Nomura et al. | |
| 2005/0019646 A1 * | 1/2005 | Joos | H01M 4/8626 |
| | | | 429/434 |
| 2005/0031936 A1 | 2/2005 | Joos | |
| 2006/0134502 A1 | 6/2006 | Garceau | |
| 2009/0017355 A1 | 1/2009 | Kawabata et al. | |
| 2012/0094208 A1 * | 4/2012 | Sugiura | H01M 8/0206 |
| | | | 429/482 |
| 2014/0072896 A1 * | 3/2014 | Poirot-Crouvezier | H01M 8/04097 |
| | | | 429/444 |
| 2015/0180061 A1 * | 6/2015 | Wuillemin | H01M 8/2425 |
| | | | 429/434 |

FOREIGN PATENT DOCUMENTS

| | | |
|---|---|---|
| JP | 2006-504872 | 2/2006 |
| WO | WO 2004/102710 A1 | 11/2004 |
| WO | WO 2012/152623 A1 | 11/2012 |

OTHER PUBLICATIONS

Japanese Office Action dated Jul. 28, 2020, in Japanese Application No. 2016-163419, English translated, 7 pages.

* cited by examiner

STACK OF ELECTROCHEMICAL CELLS DIVIDED UP INTO SEPARATE GROUPS COMPRISING A HOMOGENIZATION COMPARTMENT

TECHNICAL FIELD

The field of the invention is that of electrochemical reactors, such as, for example, fuel cells and electrolyzers, and more precisely, reactors comprising a stack of electrochemical cells divided up into several separate groups of cells designed to be selectively supplied with the same reactive gas.

PRIOR ART

A fuel cell comprises a stack of electrochemical cells, each comprising an anode and a cathode, electrically separated from each other by an electrolyte, in which an electrochemical reaction takes place between two reactants which are introduced in a continuous manner. In the case of a hydrogen fuel cell, the fuel (hydrogen) is brought into contact with the anode, whereas the fuel (oxygen), for example contained in air, is brought into contact with the cathode. The electrochemical reaction is subdivided into two sub-reactions, an oxidation and a reduction, which respectively take place at the anode/electrolyte interface and at the cathode/electrolyte interface. It requires the presence of an ionic conductor between the two electrodes, namely the electrolyte, and an electronic conductor formed by the external electrical circuit. The stack of cells is where the electrochemical reaction takes place: the reactants must be transported there, the products and the non-reactive species must be evacuated from there, together with the heat produced.

FIGS. 1a and 1b illustrate an architecture of a stack of electrochemical cells such as described in the document WO2012/152623 which prevents an accumulation of non-reactive species within the cells. For this purpose, the electrochemical cells are divided up into several separate groups of cells, for example into two groups A and B such as shown here, designed to be selectively supplied with the same reactive species, here with hydrogen.

FIG. 1a illustrates the anode face 31A of a bipolar plate 30A of a cell 10A of the group A and FIG. 1b illustrates the anode face 31B of a bipolar plate 30B of a cell 10B of the group B. The anode faces 31A, 31B of the bipolar plates comprise a distribution circuit 50A, 50B, formed of channels 52A, 52B disposed in parallel with one another, which extends from an inlet 51A, 51B, upstream of and close to which are situated two supply collectors 2A and 2B designed to provide the supply of hydrogen to the cells. The supply collectors are formed from an opening passing through the stack of bipolar plates, and are structured on the latter in such a manner as to allow the flow of hydrogen towards the distribution circuit for the cell of the corresponding group and to block the flow of hydrogen towards the cell of the other groups. More precisely, with reference to FIG. 1a, the supply collector 2B is isolated, in a fluid sense, from the distribution circuit 50A of the cell 10A by means of a peripheral air-tight seal, whereas the supply collector 2A comprises injection conduits 32A allowing the flow of hydrogen in the direction of the distribution circuit 50A of the cell 10A. Similarly, and with reference to FIG. 1b, the supply collector 2A is isolated, in a fluid sense, from the distribution circuit 50B of the cell 10B by means of a peripheral air-tight seal, whereas the supply collector 2B comprises injection conduits 32B allowing the flow of hydrogen in the direction of the distribution circuit 50B of the cell 10B.

In operation, the groups A and B of cells are selectively supplied with hydrogen in an alternating manner. This selective alternating supply leads to a mixing of the non-reactive species from one group of cells with the other thus preventing the localized accumulation of these species within the same group of cells.

However, this stack architecture of electrochemical cells where several supply collectors are placed upstream of and close to the inlet of the distribution circuit leads to a non-uniformity of the flow in the various distribution channels. Indeed, with reference to FIG. 1a, the channels 52A of the distribution circuit 50A are supplied in a substantially uniform manner by the collector 2A given that the latter is disposed substantially opposite the inlet 51A of the distribution circuit 50A. On the other hand, as shown in FIG. 1b, the channels 52B of the distribution circuit 50B are supplied in a non-uniform manner by the supply collector 2B, given that the latter is globally offset with respect to the inlet 51B of the distribution circuit 50B. Thus, the channels 52B close to the collector 2B will be supplied with hydrogen, whereas the channels 52B further away will have a lower flow rate of hydrogen. The hydrogen molar flow rate will therefore not be uniform within the various channels of the distribution circuit, which can lead to a degradation of the electrochemical performance of the cells of the group in question. Moreover, the imbalance in operation between the various groups of cells can also induce a reduction in the electrochemical performance of the fuel cell.

DESCRIPTION OF THE INVENTION

The aim of the invention is to overcome, at least in part, the drawbacks of the prior art, and more particularly to provide a stack of electrochemical cells divided up into several separate groups, each group of cells comprising a supply collector designed to bring the same reactive species to a distribution circuit for the cells of the group in question, whose fluid-flow architecture provides a more uniform flow for this reactive species in the distribution circuit of at least one of the electrochemical cells.

For this purpose, the invention provides a stack of electrochemical cells:

the said electrochemical cells being divided up into N separate groups of cells, N≥2;
each electrochemical cell comprising a distribution circuit designed to distribute a reactive species over an electrode of the cell;
each group of cells comprising a separate supply collector, disposed upstream of an inlet of the distribution circuit of each cell of the stack, and designed to allow the flow of the said reactive species towards the said inlet of the distribution circuit for the cells of the said group and to block the flow of the said reactive species towards the cells of the other groups.

According to the invention, at least a first cell from amongst the said electrochemical cells comprises a homogenization compartment comprising:

a plurality of longitudinal conduits designed to receive the flow of the said reactive species coming from the supply collector of the corresponding group, and to distribute it over the inlet of the distribution circuit of the first cell; and
a transverse homogenization conduit connecting the longitudinal conduits to one another in a fluid sense.

Certain preferred, but non-limiting, aspects of this stack of electrochemical cells are as follows:

Preferably, the transverse conduit of the homogenization compartment connects, in a fluid sense, all the longitudinal conduits of the said compartment. The transverse conduit may have a longitudinal dimension substantially equal to the width of the inlet of the distribution network. The longitudinal conduits of the compartment may be arranged, or disposed, substantially opposite to the entire width of the inlet of the distribution network.

Preferably, the supply collectors of the groups of cells are adjacent in pairs, in other words they are disposed side by side. They supply the cells with the same reactive species. For example, a first supply collector supplies a first group of cells with hydrogen, respectively with oxygen, and a second supply collector adjacent to the first supplies a second group of cells with hydrogen, respectively with oxygen.

The supply collectors of the groups of cells may be disposed opposite, in other words facing, the inlet of the distribution network. Thus, the inlet of the distribution network is sufficiently wide to be opposite the said groups supplying the groups of cells with the same reactive species.

The said longitudinal conduits are preferably interposed between the said supply collectors and the inlet of the distribution circuit of the first cell, and are disposed substantially opposite the said collectors, on the one hand, and the said inlet on the other.

The average transverse size of the said transverse conduit of the homogenization compartment is preferably greater than that of each of the said longitudinal conduits.

The longitudinal conduits and the transverse conduit of the homogenization compartment are preferably tubular members formed in a first bipolar plate of the first cell, the tubular members coming out onto a main face of the said first plate oriented towards the said electrode.

The bipolar plate is preferably formed from two parts assembled together, and comprises a first and a second sealing line locally ensuring the sealing between the two parts of the plate, the first line running in a continuous manner around the collector not supplying the cell, and the second line in a continuous manner around the collectors and the homogenization compartment.

The distribution circuit for the first cell preferably comprises a plurality of parallel channels running from the said inlet, the number of longitudinal conduits being substantially greater than or equal to the number of channels, each longitudinal conduit preferably coming out substantially opposite one or more channels.

The supply collector designed to supply the said first cell preferably comprises injection conduits coming out on a main face of a first bipolar plate of the first cell oriented towards the said electrode, the number of longitudinal conduits being greater than the number of injection conduits, each longitudinal conduit preferably coming out substantially opposite one or more injection conduits.

The supply collector or collectors not intended to supply the said first cell preferably comprise blind conduits not coming out on a main face of a first bipolar plate of the first cell oriented towards the said electrode, the number of longitudinal conduits being greater than the number of blind conduits, each longitudinal conduit coming out substantially opposite a blind conduit.

The transverse conduit of the homogenization compartment preferably runs in a continuous manner around the said supply collectors on a first bipolar plate of the first cell and is assembled so as to be leak-tight from a second bipolar plate of the said cell.

The transverse conduit of the homogenization compartment preferably has a straight transverse cross-section whose average size increases starting from one edge of the inlet of the distribution circuit.

The supply collector designed to supply the said first cell preferably comprises injection conduits coming out on a main face of a second bipolar plate of the first cell, the said main face of the said second plate being oriented towards a second electrode separated from the first electrode of the first cell by an electrolytic membrane, and communicating with the longitudinal conduits of the homogenization compartment.

Between the injection conduits of the said second bipolar plate and the longitudinal conduits, a sealing membrane is preferably interposed comprising at least one through-orifice, the latter preferably being disposed opposite at least one longitudinal conduit distal relative to the injection conduits of the second bipolar plate.

The said sealing membrane preferably comprises a plurality of through-orifices distributed substantially opposite longitudinal conduits of the homogenization compartment.

Between the injection conduits of the second bipolar plate and the longitudinal conduits, a layer of a porous material is preferably interposed that is designed to ensure the diffusion of the flow of the reactive species in the direction of the said longitudinal conduits.

Each electrochemical cell preferably comprises a homogenization compartment, the said compartments being superposed onto one another and preferably identical to one another.

BRIEF DESCRIPTION OF THE DRAWINGS

Other aspects, aims, advantages and features of the invention will become more clearly apparent upon reading the following detailed description of preferred embodiments of the latter, given by way of non-limiting examples, and presented with reference to the appended drawings in which.

DETAILED DESCRIPTION OF PARTICULAR EMBODIMENTS

In the figures and in the rest of the description, the same references represent identical or similar elements. In addition, the various elements are not shown to scale so as to enhance the clarity of the figures.

Various embodiments and variants will be described with reference to an electrochemical reactor comprising a stack of cells divided up into various separate groups, the cells being designed to be supplied in a selective manner. The anode side of a hydrogen fuel cell will in particular be considered, the cell here being supplied with hydrogen on the anode side and with oxygen on the cathode side. The invention is however applicable to the cathode side supplied with oxygen. The invention is, generally speaking, applicable to any type of fuel cell, in particular to those operating at low temperature, in other words at a temperature less than 250° C., and also to electrochemical electrolyzers.

Figure 1A:
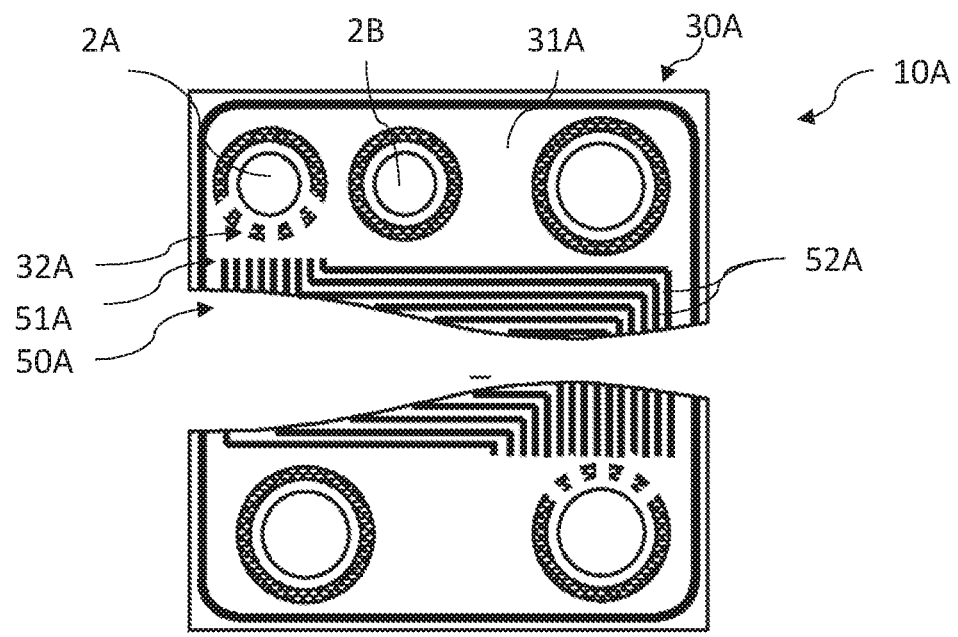
FIGS. 1a and 1b illustrate an architecture of a stack of electrochemical cells.
Figure 1B:
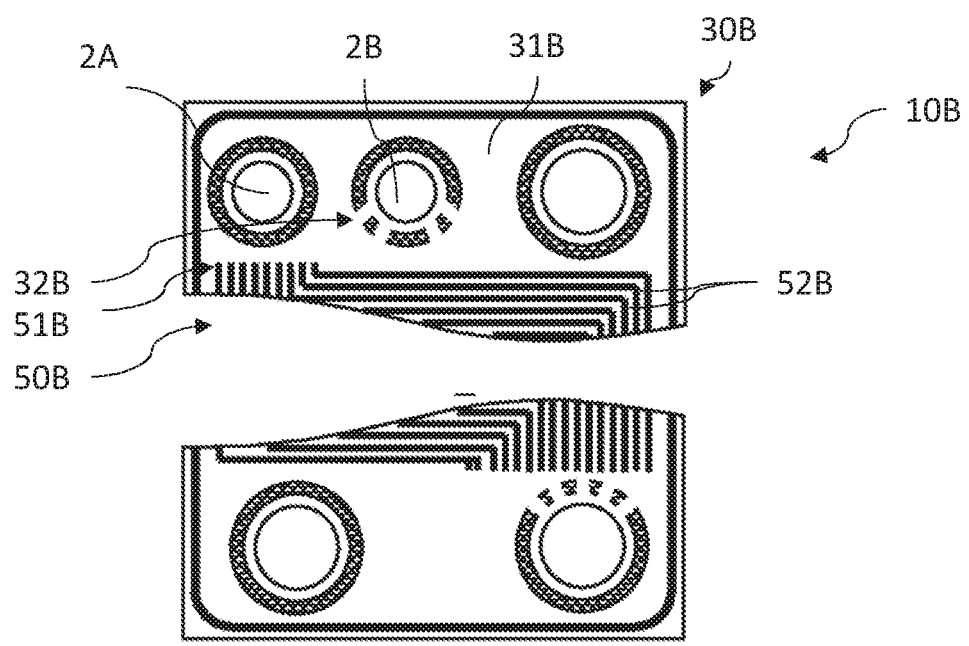
Figure 2:
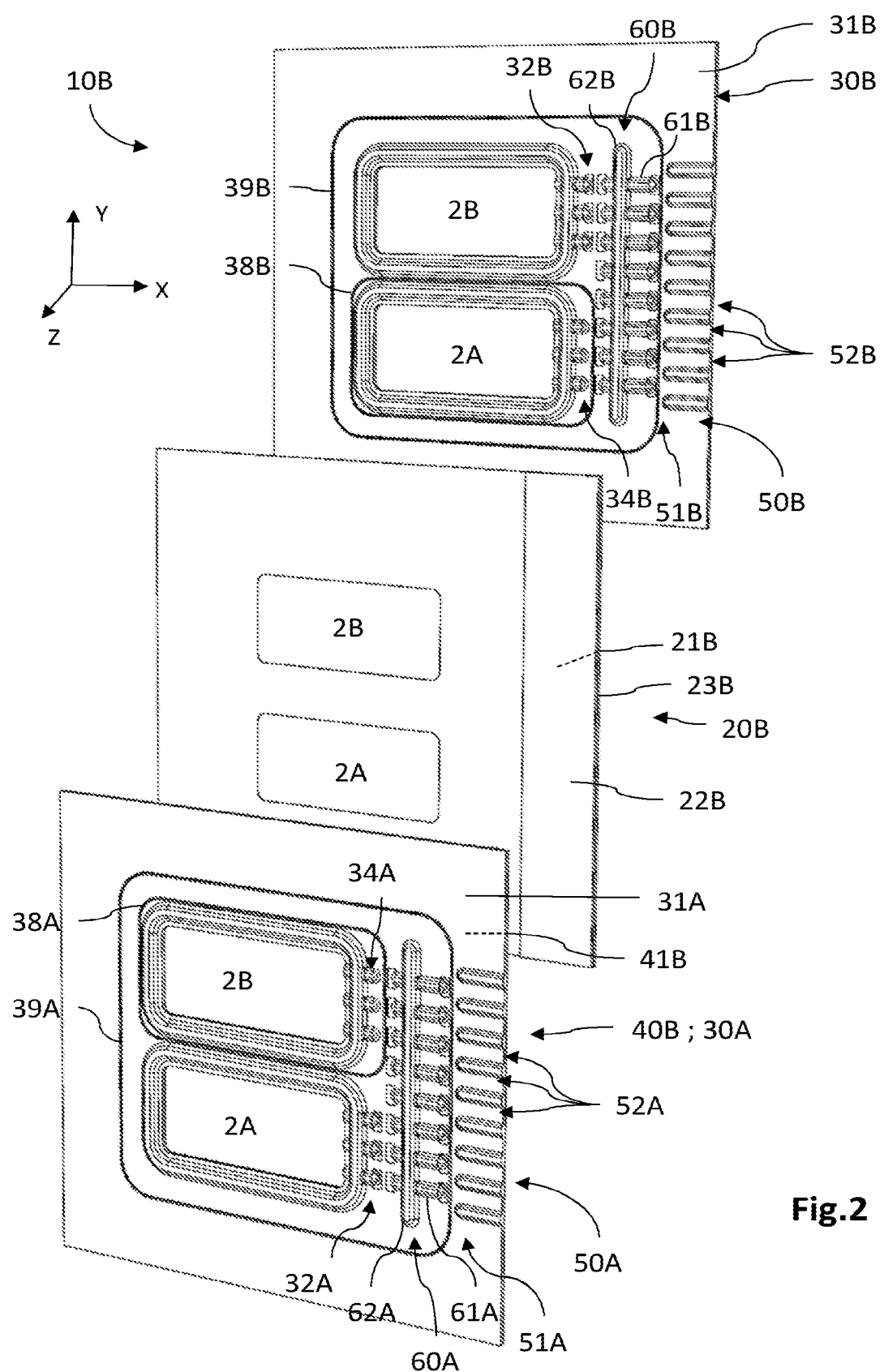
FIG. 2 is an exploded and perspective view of a part of a stack of electrochemical cells according to one embodiment.

FIG. 2 illustrates an exploded view of a part of a stack of electrochemical cells of a hydrogen fuel cell, the cells being divided up into N separate groups, with N a natural integer greater than or equal to 2. Here, the cells are divided up into two separate groups A and B, and an electrochemical cell belonging to the group B is shown.

The cells are preferably identical to one another. The cells of the various groups of the same stack may be disposed in an interleaved manner, so that a cell of one group is adjacent to a cell of another group.

A three-dimensional orthonormal reference frame is defined here and for the remainder of the description, where the axes X and Y are oriented along the main plane of the cells and the axis Z is oriented in a manner substantially orthogonal to the main plane of the cells.

The cells each comprise a first electrode, here the anode, and a second electrode, the cathode, separated from each other by an electrolytic membrane, thus forming an electrode-membrane assembly. The anode, the membrane and the cathode are conventional elements known to those skilled in the art and are not therefore described in detail. The assembly extends according to a main plane of the cell substantially parallel to the plan (X,Y).

Each assembly is separated from that of the adjacent cells by bipolar plates. Each bipolar plate comprises a first main face, or anode face, designed to be partially in contact with the anode, and a second main face, or cathode face, opposite to the anode face, designed to be partially in contact with the cathode. Each bipolar plate is designed to bring the reactive species to the anode of a first cell, on the one hand, and to the cathode of an adjacent cell, on the other, and to evacuate the products coming from the electrochemicals reactions and the non-reactive species, and also to transmit the electrical current between the cells. It can also enable the flow of a cooling fluid between the cells in such a manner as to enable the evacuation of the heat produced.

Here, the stack of cells 2 comprises separate supply collectors 2A, 2B, each formed from an opening which passes through the stack of cells, and more precisely, which passes through the bipolar plates 30B, 40B of the cell 10B opposite an edge of the electrode-membrane assembly 20B.

The supply collectors 2A, 2B are designed to ensure the fluid flow of the same reactive species, here hydrogen, with a view to selectively supplying the anode of the cells of the two groups A and B.

A first bipolar plate 30B of the cell 10B thus comprises two through-openings which participate in forming the collectors 2A and 2B. The collector 2B comprises conduits 32B, formed in the bipolar plate 30B, which, on the one hand, communicate with the through-opening of the collector 2B and, on the other hand, come out on the main face 31B, or anode face, of the bipolar plate 30B, this face being oriented towards the anode 21B of the cell 10B. The conduits 32B thus form injection conduits, or injectors, designed to allow the flow of hydrogen from the collector 2B in the direction of the anode face 31B of the bipolar plate. The collector 2A here comprises conduits 34B, formed in the bipolar plate, which communicate with the through-opening of the collector 2A but do not come out on the anode face 31B of the bipolar plate. These blind conduits 34B are designed to block the flow of hydrogen flowing in the collector 2A in the direction of the anode face 31B of the bipolar plate.

The bipolar plate 30B comprises a distribution circuit 50B, formed in the bipolar plate 30B and designed to ensure the distribution of the hydrogen coming from the collector 2B over the anode face 31B. The distribution circuit 50B is formed from a network of parallel distribution channels 52B, which extend from an inlet 51B of the circuit, situated opposite the collectors A and B, and more precisely here, opposite the injection conduits 32B of the collector 2B and the blind conduits 34B of the collector 2A.

The bipolar plate 30B furthermore comprises a homogenization compartment 60B situated between the injection conduits 32B of the collector 2B and the inlet 51B of the distribution circuit 50B. This homogenization compartment 60B comprises a plurality of longitudinal conduits 61B for distributing the fluid flow and at least one transverse homogenization conduit 62B connecting, in a fluid sense, the longitudinal conduits 61B to one another. The longitudinal conduits 61B are designed to receive the flow of hydrogen coming from the collector 2B and to distribute this flow over the inlet 51B of the distribution circuit 50B. For this purpose, the longitudinal conduits 61B are conduits formed in the bipolar plate 30B which come out on the anode face 31B, on the one hand, opposite the injection conduits 32B of the collector 2B, and on the other, opposite the inlet 51B of the distribution circuit 50B. Distributing the flow is understood to mean that all the longitudinal conduits 61B, to within 10%, distribute a part of the flow coming from the collector 2B. The transverse homogenization conduit 62B is a conduit formed in the bipolar plate 30B which connects the longitudinal conduits 61B together, so that the hydrogen entering into a few longitudinal conduits 61B flows away into the transverse conduit 62B before coming out again on more or less all the longitudinal conduits 61B in the direction of the distribution circuit 50B. The transverse conduit 62B here runs along an axis substantially orthogonal to the axis along which the longitudinal conduits 61B run. More generally speaking, the axes along which the longitudinal conduits and the transverse conduit respectively run form an angle preferably greater than or equal to 45°, here substantially equal to 90°. Thus, the homogenization compartment ensures a uniform distribution of the flow of hydrogen, coming from the collector 2B, in the direction of the inlet 51B of the distribution circuit 50B.

Similarly, the second bipolar plate 40B also comprises two through-openings which participate in forming the collectors 2A and 2B. It comprises a main face 41B, or cathode face, oriented towards the cathode 22B of the cell 10B, and an opposing main face, or anode face, oriented towards the anode of an adjacent cell (not shown) belonging to the group A. Thus, the second bipolar plate 40B of the cell 10B also corresponds to the first bipolar plate 30A of the adjacent cell (not shown). The collector 2A is here designed to supply hydrogen to the anode of the adjacent cell. It comprises conduits 32A, formed in the bipolar plate 30A, which, on the one hand, communicate with the through-opening of the collector 2A and, on the other, come out onto the anode face 31A of the bipolar plate 30A. They thus form injection conduits 32A, or injectors, designed to allow the flow of hydrogen from the collector 2A in the direction of the anode face 31A of the bipolar plate 30A. The collector 2B here comprises conduits 34A, formed in the bipolar plate 30A, which communicate with the through-opening of the collector 2B but do not come out onto the anode face 31A of the bipolar plate 30A. These blind conduits 34A are designed to block the flow of hydrogen flowing in the collector 2B in the direction of the anode face 31A of the bipolar plate 30A.

The bipolar plate 30A comprises a distribution circuit 50A, formed in the bipolar plate 30A and designed to ensure the distribution of the hydrogen coming from the collector 2A over its anode face 31A. The distribution circuit 50A is composed of a network of parallel distribution channels 52A which run from an inlet 51A of the circuit, situated opposite the collectors A and B, and more precisely, here, opposite the injection conduits 32A of the collector 2A and the blind conduits 34A of the collector 2B. The distribution circuit 50A of the bipolar plate 30A is here structurally identical to that of the bipolar plate 30B, the inlets 51A and 51B, together with the channels 52A and 52B, being respectively superposed onto one another in the direction Z.

Similarly, the bipolar plate 30A furthermore comprises a homogenization compartment 60A situated between the injection conduits 32A of the collector 2A and the inlet 51A of the distribution circuit 50A. This homogenization compartment 60A comprises a plurality of longitudinal conduits 61A for distributing the fluid flow and at least one transverse conduit 62A for homogenization connecting, in a fluid sense, the longitudinal conduits 61A to one another. The longitudinal conduits 61A are designed to receive the flow of hydrogen coming from the collector 2A and to distribute this flow over the inlet 51A of the distribution circuit 50A. For this purpose, the longitudinal conduits 61A are conduits formed in the bipolar plate 30A which come out on the anode face 31A, on the one hand, opposite the injection conduits 32A of the collector 2A, and on the other, opposite the inlet 51A of the distribution circuit 50A. The transverse conduit 62A for homogenization is a conduit formed in the bipolar plate 30A which connects the longitudinal conduits 61A together, so that the hydrogen entering into a few longitudinal conduits flows away into the transverse conduit 62A before exiting again over approximately all the longitudinal conduits 61A in the direction of the distribution circuit 50A. Thus, the homogenization compartment ensures a uniform distribution of the flow of hydrogen, coming from the collector 2A, over the inlet 51A of the distribution circuit 50A. The homogenization compartment 60A of the bipolar plate 30A is here, preferably, structurally identical to that of the bipolar plate 30B, the longitudinal conduits 61A and 61B, together with the transverse conduits 62A and 62B, being respectively superposed onto one another along the direction Z.

When the bipolar plates 30B, 40B are formed from two parts assembled together, for example from two electrically-conducting metal plates where the various conduits correspond to bosses formed by pressing, or from two parts made of composite material, for example loaded with graphite, where the bosses forming the various conduits are formed by moulding, they each advantageously comprise two sealing lines disposed in such a manner as to avoid the flow of the supply fluid between the two plate parts elsewhere than in predefined areas.

Thus, the bipolar plate 30B comprises a first sealing line 38B, referred to as internal, disposed in such a manner as to prevent the supply fluid flowing in the collector, not intended to supply the cell, from flowing away between the two parts of the bipolar plate. The internal sealing line 38B here surrounds the collector 2A not supplying the cell 10B, more precisely the through-opening and the blind conduits 34B of the collector 2A. It runs in a continuous manner between the collector 2A, on the one hand, and the collector 2B and the homogenization compartment 60B on the other, and therefore locally ensures the sealing between the two parts forming the bipolar plate 30B, which prevents the supply fluid flowing in the collector 2A from flowing away between the two plate parts 30B of the cell 10B elsewhere than in the area bounded by the internal line 38B.

Advantageously, the bipolar plate 30B here comprises a second sealing line 39B, referred to as external, disposed in such a manner as to prevent the supply fluid passing through the homogenization compartment 60B from flowing away between the two parts of the bipolar plate into unintended areas, for example into the area provided as the cooling circuit. Here, it surrounds the collectors 2A and 2B, together with the homogenization compartment 60B, in a continuous manner and runs notably between the compartment 60B and the inlet 51B of the distribution circuit 50B. It locally ensures the sealing between the two parts forming the bipolar plate 30B, and thus prevents the supply fluid passing through the homogenization compartment 60B from subsequently flowing away between the two plate parts 30B of the cell 10B elsewhere than into the area bounded by the external line 39B, in other words for example into the cooling circuit.

Similarly, the bipolar plate 30A (also referenced 40B in FIG. 2) comprises a first internal sealing line 38A which surrounds the collector 2B in a continuous manner, and a second sealing line 39A which surrounds the collectors 2A and 2B, together with the homogenization compartment 60A, in a continuous manner.

The sealing lines may be formed by any means able to locally ensure the sealing between the two plate parts, for example by soldering, brazing, or even by adhesive bonding.

Figure 3A:
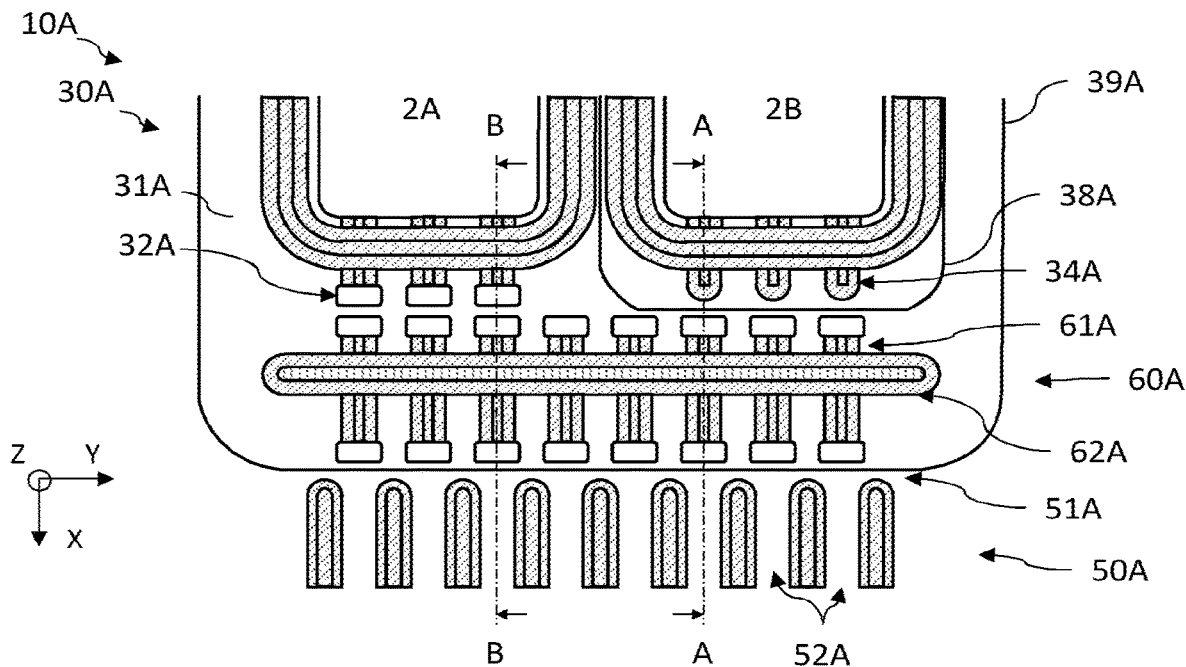
FIGS. 3a and 3b are partial and schematic representations as a top view of the main anode face of a bipolar plate of a cell belonging to a first group of cells (FIG. 3a) and of the main anode face of a bipolar plate of a cell belonging to a second group of cells distinct from the first group (FIG. 3b) for the stack of cells shown in FIG. 2.
Figure 3B:
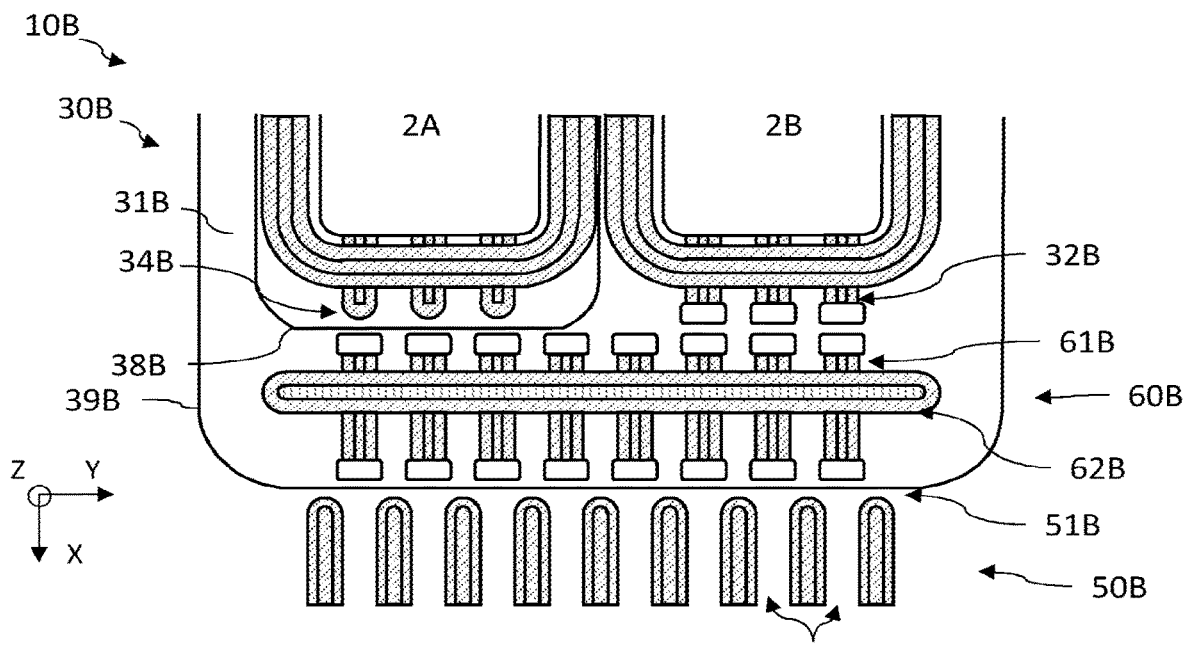

FIGS. 3a and 3b respectively illustrate top views of the anode faces 31A, 31B of the bipolar plates 30A, 30B shown in FIG. 2.

With reference to FIG. 3a, the supply collectors 2A and 2B pass through the stack of electrochemical cells, and more particularly the bipolar plate 30A of the cell 10A, and are disposed upstream of the inlet 51A of the distribution circuit 50A.

The supply collector 2A is designed to supply the anode of the cell 10A with hydrogen given that the cell 10A belongs to the group A of cells intended to be supplied by the collector 2A. It comprises, for this purpose, injection conduits 32A coming out on the anode face 31A of the bipolar plate 30A. In the figure, three injection conduits are shown that run longitudinally along the direction X in a rectilinear manner; however, other longitudinal shapes may be provided.

The supply collector 2B is not intended to supply the anode of the cell 10A with hydrogen flowing in this collector, given that the cell 10A does not belong to the group B of cells intended to be supplied by the collector 2B. Here, it comprises conduits 34A not coming out on the anode face 31A of the bipolar plate 30A. In the figure, three injection conduits are shown that run longitudinally along the direction X in a rectilinear manner; however, other longitudinal shapes may be provided. It is surrounded by an internal sealing line 38A.

As previously described, the bipolar plate 30A comprises a distribution circuit 50A formed from a network of channels 52A designed to ensure the distribution of hydrogen coming from the supply collector 2A over the anode of the cell 10A. The distribution circuit 50A comprises an inlet 51A situated close to and opposite the supply collectors 2A and 2B. The inlet 51A of the distribution circuit 50A here has a width, in other words a dimension here along the axis Y, greater than the injection width of the collector 2A. The width of the distribution circuit is defined as the distance separating the two channels that are furthest from each other, and the injection width of a collector is defined as the distance separating the two injection conduits furthest from each other. In the example in FIG. 3a, the inlet 51A of the distribution circuit 51A is facing both the injection conduits 32A of the collector 2A and the blind conduits 34A of the collector 2B. The inlet 51A of the distribution circuit 50A here has a width approximately equal, to within 10%, to the sum of the injection width of the collector 2A and of the width of the blind conduits of the collector 2B.

As previously described, the bipolar plate 30A also comprises a homogenization compartment 60A situated between the injection conduits 32A of the collector 2A and the inlet 51A of the distribution circuit 50A. The homogenization compartment 60A comprises a plurality of longitudinal distribution conduits 61A connected together via at least one transverse homogenization conduit 62A. The longitudinal conduits 61A comprise an inlet oriented towards the side of the collectors 2A and 2B with respect to the transverse conduit 62A, and an outlet oriented towards the side of the distribution circuit 50A with respect to the transverse conduit 62A. The longitudinal conduits 61A and the transverse conduit 62A are formed in the bipolar plate 30A, and the inlets and outlets of the longitudinal conduits 61A come out onto the anode face 31A. An external sealing line 39A surrounds the homogenization compartment 60A and the collectors 2A and 2B.

In this example, and advantageously, the homogenization compartment 60A is disposed both between the injection conduits 32A of the collector 2A and the blind conduits 34A of the collector 2B, on the one hand, and the inlet 51A of the distribution circuit 50A on the other. Here, it comprises a number of longitudinal conduits 61A approximately equal to, to within 10%, or greater than the number of channels 52A of the distribution circuit 50A, and each longitudinal conduit 61A comes out substantially opposite one or more channels 52A. Thus, the homogenization compartment ensures the distribution of the flow of hydrogen coming from the collector 2A which exits from the longitudinal conduits 61A substantially opposite the inlet of the channels 52A. The flow of hydrogen coming from the collector 2A is distributed over substantially the whole inlet of the circuit, so that hydrogen is supplied to substantially all the distribution channels. Moreover, the reduction in the local losses of charge at the inlet of the distribution circuit, by a local alignment between the longitudinal conduits 61A and the channels 52A, can allow the flow of hydrogen at the inlet of the distribution circuit to be improved.

In this example, and advantageously, the number of longitudinal conduits 61A is greater than that of the injection conduits 32A of the collector 2A, and each longitudinal conduit 61A can come out opposite one or more injection conduits 32A, in other words the inlet of the conduits 61A are each substantially opposite the outlet of one or more injectors 32A. This can result in an alignment of the longitudinal axes of the injectors 32A and of the longitudinal conduits 61A, here substantially coinciding with the axis X. Thus, the homogenization compartment ensures the collection of the hydrogen coming from the supply collector 2A by means of the injection conduits 32A, where the reduction in the local losses of charge between the injection conduits 32A and the longitudinal conduits 61A allows the flow of hydrogen to be improved.

In this example, and advantageously, the number of longitudinal conduits 61A is greater than that of the blind conduits 34A of the collector 2B, and each blind conduit 34A runs substantially opposite a longitudinal conduit 61A, in other words the longitudinal axis of the blind conduit 34A is substantially aligned with that of a longitudinal conduit 61A.

It is also advantageous for the straight transverse cross-section of the transverse conduit 62A, here across a cross-sectional plane parallel to the plane (X,Z), to be greater than—for example twice as large as—the transverse cross-section of each of the longitudinal conduits 61A, here across a cross-sectional plane parallel to the plane (Y,Z), in such a manner as to favour the uniform mixing, or homogenization, of the flow of hydrogen in the transverse conduit 62A, and thus to allow the distribution of the flow at the inlet of the distribution circuit to be rendered more uniform. The hydrogen molar flow rate in the various channels 52A of the distribution circuit 50A is thus rendered more uniform.

With reference to FIG. 3b, the bipolar plate 30B of the cell 10B is similar to the bipolar plate 30A previously described, and differs from it essentially in that the supply collector 2B is designed to supply the anode of the cell 10B with hydrogen, whereas the supply collector 2A is not intended to supply the anode of the cell 10B. For this purpose, the collector 2B comprises injection conduits 32B coming out on the anode face 31B of the bipolar plate 30B, and the collector 2A here comprises blind conduits not coming out on the same anode face 31B. The distribution circuit 50B and the homogenization compartment 60B are preferably identical to those described with reference to FIG. 3a. An internal sealing line 38B surrounds the collector 2A and an external sealing line 39B surrounds the collectors 2A, 2B and the homogenization compartment 60B.

Thus, as shown in FIGS. 3a and 3b, each electrochemical cell comprises a homogenization compartment disposed in such a manner that the compartments 60A, 60B are superposed onto one another. Advantageously, they are structurally identical to one another, for all the cells of the stack, whichever group they belong to. Thus, the formation of the plates of the various cells is simplified given that they differ from one another essentially by the presence or otherwise of openings at the end of the conduits 32A, 34A; 32B, 34B in such a manner as to form injection conduits 32A, 32B or blind conduits 34A, 34B. Each cell thus benefits from a uniform distribution of the flow of hydrogen at the inlet of the distribution circuit, without having to make the formation of the plates of the various cells of the stack more complex.

Figure 4A:
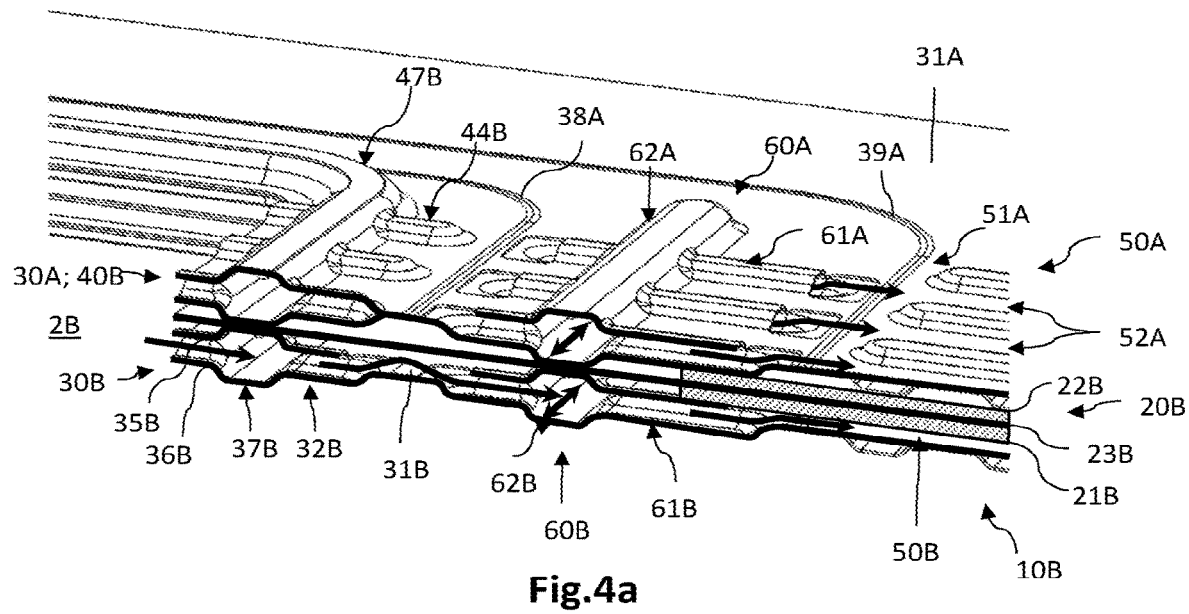
FIGS. 4a and 4b are cross-sectional and perspective views of an electrochemical cell across the planes A-A and B-B shown in FIG. 3a, respectively.
Figure 4B:
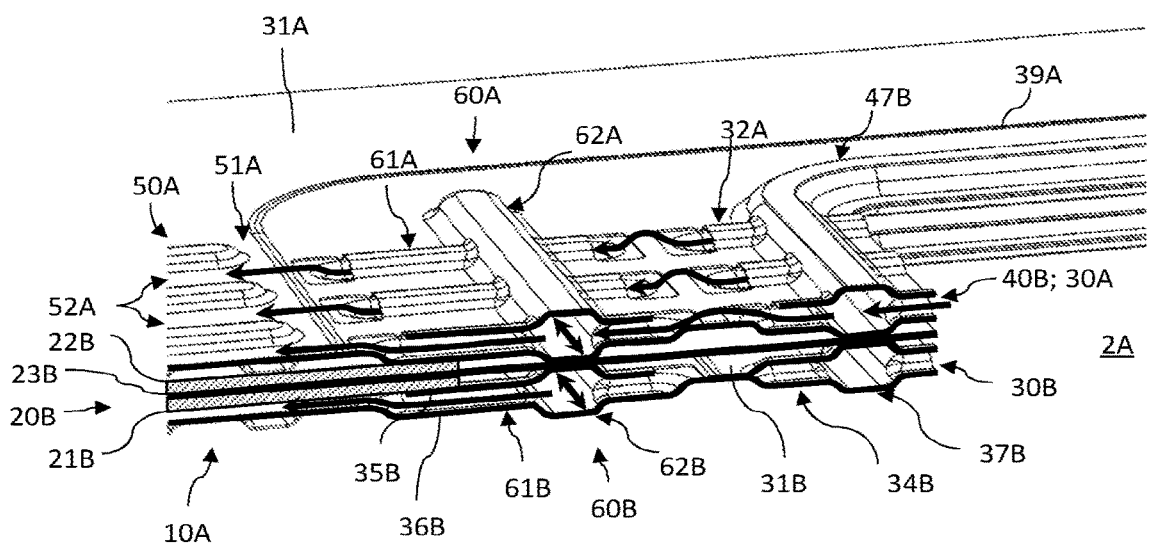

FIGS. 4a and 4b illustrate cross-sectional and perspective views of a part of the stack of electrochemical cells across the planes A-A and B-B shown in FIG. 3a. More precisely, a cell 10B of the group B is illustrated here, which comprises an electrode-membrane assembly 20B formed of an anode 21B and of a cathode 22B separated from each other by an electrolytic membrane 23B. The assembly 20B is situated between two bipolar plates 30B and 40B.

The bipolar plates 30B, 40B are here each formed from an assembly of two pressed metal plates, but they could be formed from two parts made of composite material for example loaded with graphite. The two metal plates respectively form an anode plate and a cathode plate, given that the metal plates comprise a main face designed to be in contact with a part of the anode or of the cathode of a cell.

With reference to FIG. 4a, the bipolar plate 30B is structured in such a manner as to allow the flow of hydrogen from the collector 2B towards the distribution circuit 50B of the cell 10B. For this purpose, the injection conduits 32B are here tubular members formed in the bipolar plate 30B coming out on the anode face 31B of the plate 30B. 'Tubular member' is understood to mean an element whose transverse cross-section, here across a plane parallel to the plane (Y,Z), has a closed profile allowing the reactive species in the tubular member to be contained and its flow along the longitudinal axis to be promoted. These tubular members are formed by bosses formed in the anode plate 35B and in the cathode plate 36B, protruding with respect to the main plane of the bipolar plate 30B, the latter being substantially parallel to the plane (X,Y). The tubular members 32B come out onto the collector 2B, on the one hand, and onto the anode face 31B on the other. The openings of the injection conduits 32B on the anode face 31B are obtained for example by a localized cut-out in the anode plate 35B.

The distribution circuit 50B is formed in the bipolar plate 30B by bosses formed on the anode plate 35B, defining a network of distribution channels. The distribution channels do not form tubular members, in other words the transverse cross-section of the channels across a plane parallel to the plane (Y,Z) does not have a closed profile but an open profile. Indeed, the transverse profile of the channels is open in the direction of the anode 21B so as to ensure the diffusion of the hydrogen towards the latter and to allow the collection of the products coming from the electrochemical reaction.

The homogenization compartment 60B, and more precisely the longitudinal conduits 61B and the transverse conduit 62B, are tubular members formed in the bipolar plate 30B and coming out on the anode face 31B. These tubular members are bosses formed on the anode plate 35B and cathode plate 36B of the bipolar plate 30B. The openings of the longitudinal conduits 61B on the anode face 31B are formed for example by a localized cut-out in the anode plate 35B.

These bosses may be formed by pressing when the bipolar plate is formed from two metal plates, or be formed by moulding when the bipolar plate is formed from two parts made of composite material.

The bipolar plate 40B is similar to the plate 30B and essentially differs from it in that the conduits 44B on the collector 2B, superposed onto the injection conduits 32B, are here blind. Furthermore, the homogenization compartment 60A and the distribution circuit 50A are substantially identical to those of the bipolar plate 30B. They are however supplied from the injection conduits (not shown), formed in the bipolar plate 40B and communicating with the supply collector 2A.

Furthermore, in this example, the membrane, or polymer film, forming the electrolytic membrane 23B in the active area, also extends from the assembly 20B to the collector 2B. Here, it is in contact with transverse conduits 37A and 47B surrounding the collector 2B, on the one hand, and transverse conduits 62A and 62B of the homogenization compartments 60A and 60B on the other, which contributes to locally improving the sealing.

With reference to FIG. 4b, the bipolar plates 30B and 40B essentially differ from the part described with reference to FIG. 4a in that the collector 2A comprises blind conduits 34B formed in the bipolar plate 30B and comprises injection conduits 32B formed in the bipolar plate 40B (also referenced 30A) and coming out on the anode face 31A.

In operation, the hydrogen flowing in the collector 2B passes through the injection conduits 32B of the plate 30B then enters into the longitudinal conduits 61B situated facing the latter. The hydrogen also flows in the transverse conduit 62B so that the flow of hydrogen is rendered more uniform then distributed into substantially all of the longitudinal conduits 61B. The flow of hydrogen subsequently exits from each of the longitudinal conduits 61B facing the inlet of the distribution circuit 50B and flows away into each of the channels. The hydrogen flowing in the homogenization compartment 60B here does not come from the conduits 44B of the plate 40B given that these are blind conduits. Furthermore, the hydrogen flowing in the collector 2A passes through the injection conduits 32A of the plate 30A (also referenced 40B) then enters into the longitudinal conduits 61A situated facing the latter. The hydrogen also flows into the transverse conduit 62A so that the flow of hydrogen is rendered more uniform then distributed into substantially all the longitudinal conduits 61A. The flow of hydrogen subsequently exits from each of the longitudinal conduits 61A facing the inlet 51A of the distribution circuit 50A and flows away into each of the channels 52A. The homogenization compartments thus ensure the uniform distribution of the flow of hydrogen coming from the supply collectors at the inlet of the distribution circuits. The molar flow rate of hydrogen within the various distribution channels is then substantially uniform. Moreover, the fact that the homogenization compartments and the distribution circuits are respectively superposed and identical to one another renders the process of fabrication of the stack of cells relatively simple to implement.

Figure 5:
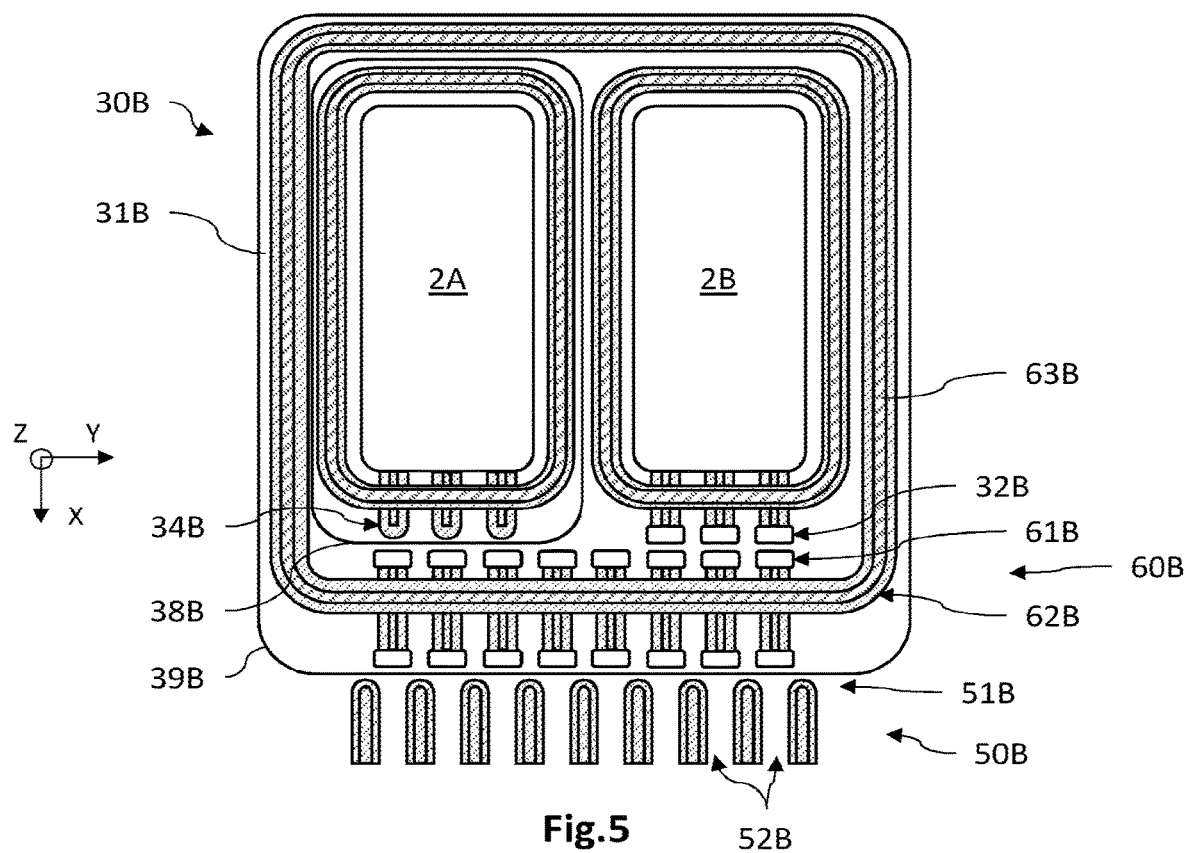
FIG. 5 is a partial and schematic representation as a top view of the main anode face of a bipolar plate according to another embodiment where the transverse homogenization conduit surrounds the supply collectors in a continuous manner.

FIG. 5 illustrates a top view of the anode face 31B of the bipolar plate 30B according to one variant of the embodiment shown in FIG. 3b. This variant differs from the embodiment in FIG. 3b essentially in that a peripheral air-tight seal 63B runs in a continuous manner around the two collectors 2A and 2B and is disposed between the latter and the distribution circuit 50B.

In this example, the transverse conduits 62A, 62B of the homogenization compartments 60A, 60B of the two bipolar plates 30B, 40B of the cell 10B run in a continuous manner around the two collectors 2A, 2B, and the peripheral seal 63B is in contact with the two transverse conduits 62A, 62B in a leak-tight manner (only the transverse conduit 62B is shown in FIG. 5). Thus, a leak-tight seal is formed locally between the two bipolar plates 30B, 40B by the peripheral seal 63B.

The hydrogen exiting from the injection conduits 32B of the collector 2B cannot get back to the distribution circuit 50B without first passing through the homogenization compartment 60B. This leak-tight seal therefore forces the hydrogen exiting from the injection conduits 30B to be introduced into a part of the longitudinal conduits 61B of the homogenization compartment 60B prior to being distributed to the inlet 51B of the distribution circuit 50B. There is thus no way that the hydrogen can bypass the homogenization compartment 60B, a fact which improves the uniform distribution of the flow of hydrogen at the inlet 51B of the distribution circuit 50B.

Figure 6:
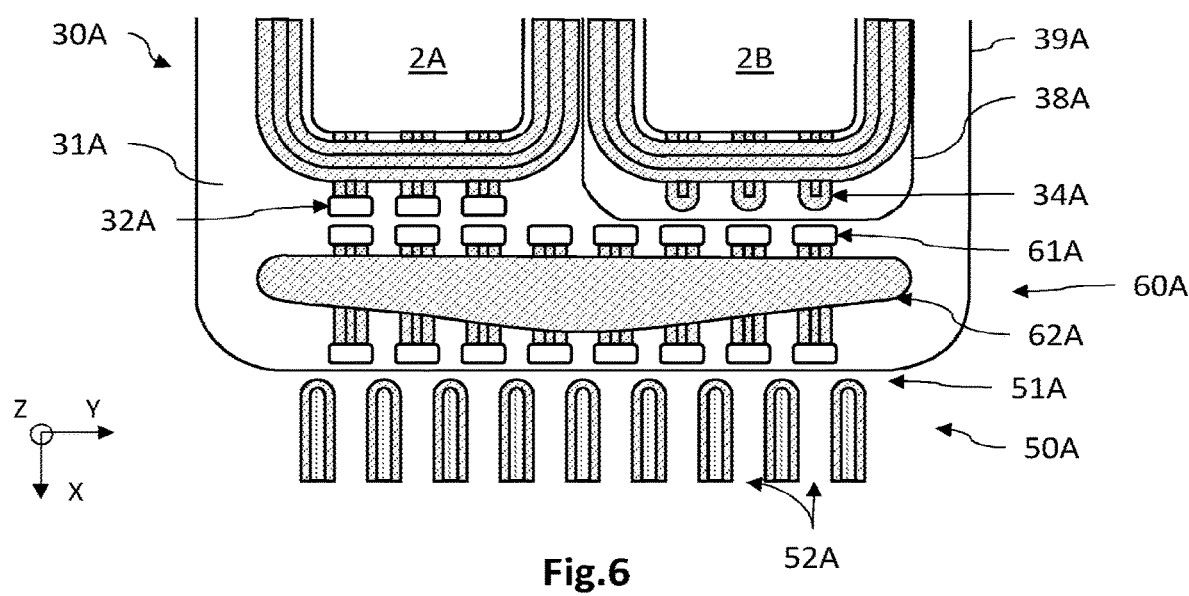
FIG. 6 is a partial and schematic representation as a top view of the main anode face of a bipolar plate according to another embodiment where the transverse homogenization conduit has a transverse cross-section of variable size.

FIG. 6 illustrates a top view of the anode face 31A of the bipolar plate 30A according to one variant of the embodiment shown in FIG. 3a. This variant essentially differs from the embodiment of FIG. 3a in that the transverse homogenization conduit 62A has a transverse cross-section of variable size. More precisely, the average dimension of the straight transverse cross-section of the homogenization conduit, here in a plane parallel to the plane (X,Z), increases starting from one edge of the inlet of the distribution circuit 50A as it gets further away from the injection conduits 32A of the collector 2A. In this example, the transverse cross-section of the homogenization conduit 62A shows a constant increase as it gets further away from the collector 2A, as far as a central position of the homogenization conduit 62A situated substantially between the two collectors 2A and 2B. It goes without saying that any other law governing the variation of the average size of the straight transverse cross-section of the homogenization conduit is possible.

Given that this homogenization conduit 62B can be identical for all the groups of cells, the transverse cross-section advantageously has the shape of a V, so that the size of the cross-section increases as it gets further from the injection conduits irrespective of the collector being considered. The average size of the straight transverse cross-section of the homogenization conduit is then maximum at the central position of the homogenization conduit 62A situated substantially between the two collectors 2A and 2B. Thus, the hydrogen coming from the collector 2A is introduced by the longitudinal conduits 61A of the homogenization compartment 60A and flows away into the transverse homogenization conduit 62A in the direction of increasing transverse size of this conduit, here in the direction +Y. In the example (not shown) of an injection of hydrogen by the collector 2B, the hydrogen is introduced into the transverse homogenization conduit then flows away into the latter in the direction −Y corresponding to the direction of increase of the average transverse size of the homogenization conduit. Thus, a better uniformity of the flow is ensured by this increase in the cross-section of the transverse channel. In addition, the uniformity of the distribution of the flow of hydrogen at the inlet of the distribution circuits of the cells of the various groups is improved by this local increase in the transverse cross-section of the transverse conduit of the homogenization compartments.

Figure 7:
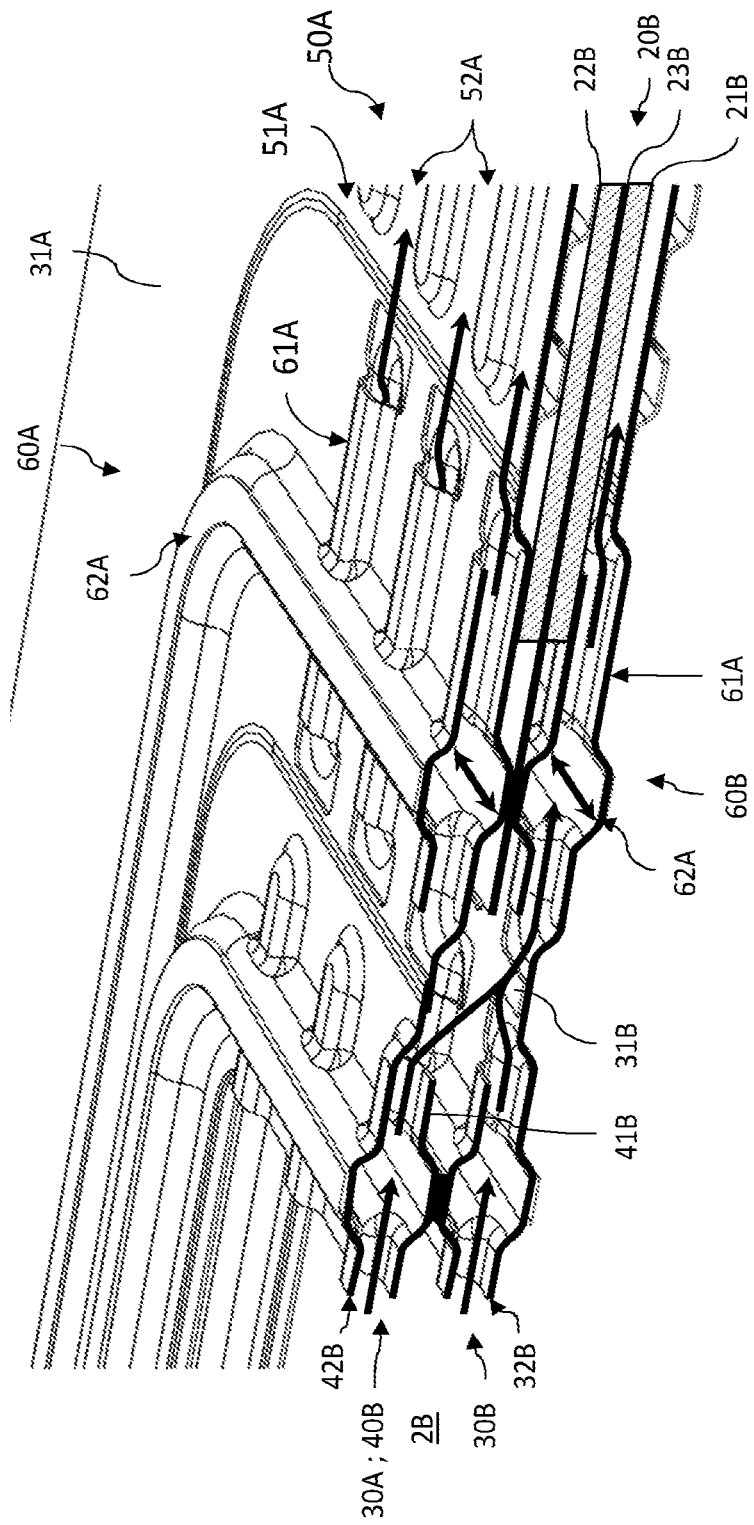
FIG. 7 is a cross-sectional and perspective view of an electrochemical cell according to one variant of the embodiment illustrated in FIG. 4a, where the supply collector comprises injection conduits on the two bipolar plates of the electrochemical cell designed to supply the anode of the said cell.

FIG. 7 illustrates a cross-sectional and perspective view of a part of the stack of electrochemical cells according to one variant of the embodiment shown in FIG. 5. This variant differs from the embodiment in FIG. 5 essentially in that the electrolytic membrane 23B does not run between the homogenization compartments 60A, 60B, on the one hand, and the supply collectors 2A, 2B on the other.

Thus, the hydrogen coming from the collector 2B and exiting from the injection conduits 32B of the bipolar plate 30B can flow away into the space bounded between the bipolar plates 30B and 40B situated between the injection conduits 32B and the inlet of the longitudinal homogenization conduits 61B. This space forms a homogenization chamber situated upstream of the homogenization compartment 60B, which contributes to improving the uniformity of the flow.

In addition, in this example, the bipolar plate 40B comprises conduits 42B which do not come out on the anode face 31A of the bipolar plate 40B (also referenced 30A in relation with an adjacent cell 10A not shown), but which come out onto the cathode face 41B upstream of the longitudinal conduits 61B. These conduits 42B are superposed onto the injection conduits 32B of the plate 30B. Thus, the hydrogen flowing in the collector 2B is introduced into the injection conduits 32B of the bipolar plate 30B and is also introduced into the conduits 42B of the bipolar plate 40B, then exits from the latter on the anode face 31B of the plate 30B and on the cathode face 41B of the plate 40B, respectively. Thus, the hydrogen entering into the longitudinal homogenization conduits 61B comes both from the injectors 32B of the bipolar plate 30B and from the injectors 42B of the bipolar plate 40B. The uniformity of the flow of hydrogen within the distribution circuit 50B is then improved.

Figure 8:
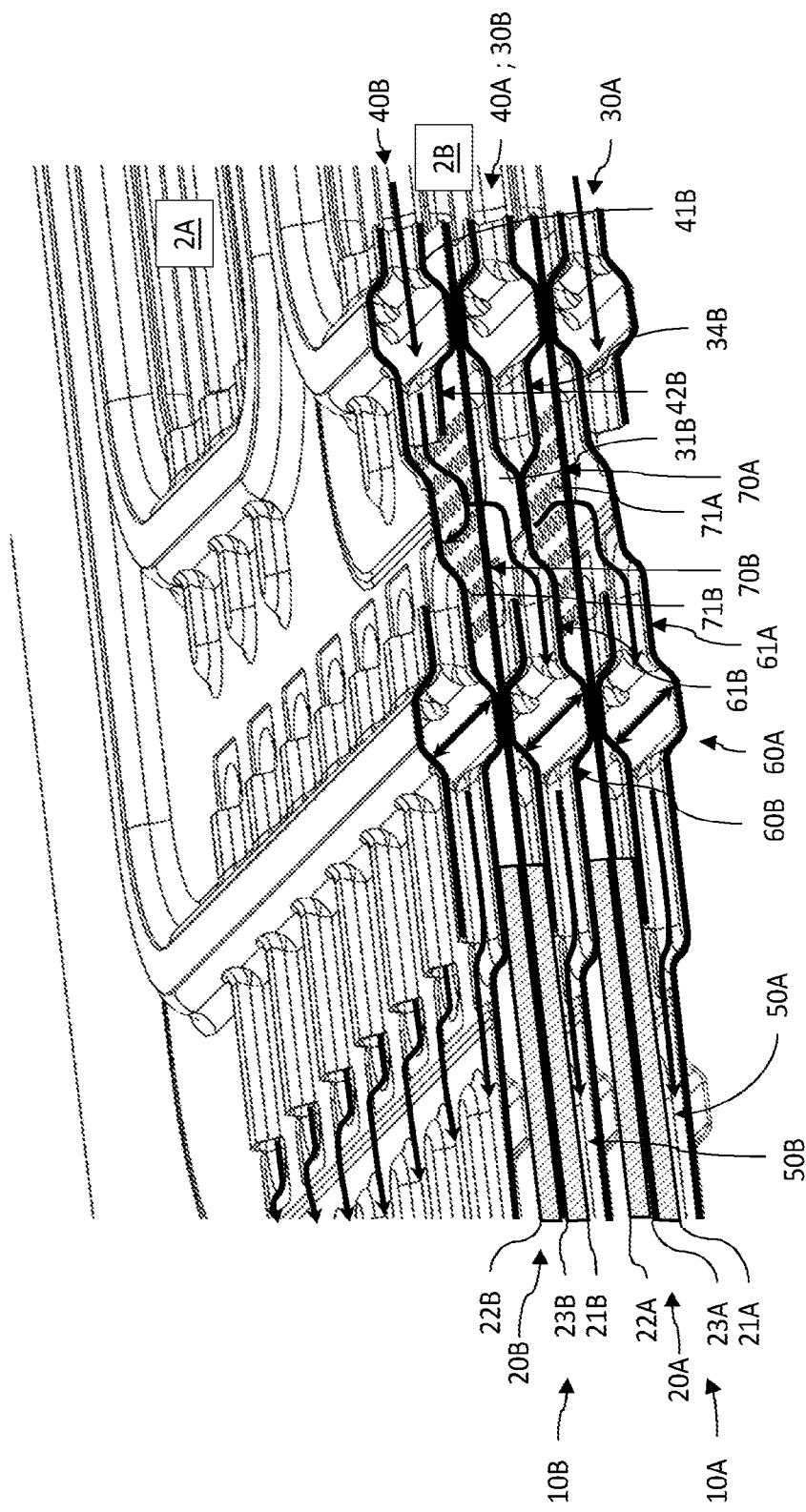
FIG. 8 is a cross-sectional and perspective view of a stack of electrochemical cells belonging to separate groups according to another embodiment, comprising two sealing membranes having a plurality of through-orifices uniformly distributed at the inlet of the corresponding distribution circuit.

FIG. 8 illustrates a cross-sectional and perspective view of another embodiment of the stack of cells, across a plane parallel to the plane (X,Z) going through the collector 2B. The stack of cells is similar to that shown in FIG. 7.

The figure shows a stack of a cell 10A and of a cell 10B. The cell 10A comprises an assembly 20A of an anode 21A and of a cathode 22A separated from each other by an electrolytic membrane 23A, disposed between a bipolar plate 30A providing the fluid supply of the anode 21A and a bipolar plate 40A providing the fluid supply of the cathode 22A. Similarly, the cell 10B comprises an assembly 20B of an anode 21B and of a cathode 22B separated from each other by an electrolytic membrane 23B, disposed between a bipolar plate 30B providing the fluid supply of the anode 21B and a bipolar plate 40B providing the fluid supply of the cathode 22A. The bipolar plate situated between the two cells 10A and 10B is referenced 40A in relation with the cell 10A and 30B in relation with the cell 10B.

Each cell 10A and 10B comprises a leak-tight membrane 70A, 70B having through-orifices each situated between the collectors 2A, 2B, on the one hand, and the homogenization compartments 60A, 60B on the other. These membranes extend according to a plane parallel to the main plane of the cells, and may be identical, or even correspond to the electrolytic membranes 23A, 23B. The through-orifices are here distributed uniformly opposite the longitudinal conduits 61A, 61B, respectively.

The homogenization compartment 60B of the bipolar plate 30B of the cell 10B is supplied with hydrogen from injection conduits 42B formed in the bipolar plate 40B communicating with the supply collector 2B and coming out on the cathode face 41B of the plate. The bipolar plate 30B here comprises conduits 34B communicating with the collector 2B but not coming out on the anode face 31B of the latter. Thus, the blind conduits 34B do not participate in the fluid supply of the distribution circuit 50B. The hydrogen supplying the longitudinal conduits 61B of the homogenization compartment 60B therefore comes from the injection conduits 42B of the bipolar plate 40B, after having passes through the orifices 71B of the leak-tight membrane 70B. Thus, the flow of hydrogen is rendered more uniform upstream of the homogenization compartment 60B, a fact which subsequently improves the uniform distribution of the flow of hydrogen at the inlet of the distribution circuit 50B.

As far as the cell 10A is concerned, the homogenization compartment 60A of the bipolar plate 30A is supplied with hydrogen from injection conduits, formed in the bipolar plate 40A, communicating with the supply collector 2A and coming out on the cathode face of the plate 30A. The bipolar plate 30A here comprises conduits communicating with the collector 2A but not coming out on the anode face of the latter. Thus, the blind conduits do not participate in the fluid supply of the distribution circuit 50A. The hydrogen supplying the longitudinal conduits 61A of the homogenization compartment 60A therefore comes from the injection conduits of the bipolar plate 40A, after having passed through the orifices 71A of the leak-tight membrane 70A. Thus, the flow of hydrogen is rendered more uniform upstream of the homogenization compartment, a fact which subsequently improves the uniform distribution of the flow of hydrogen at the inlet of the distribution circuit 50A.

In this example, and in an identical fashion to the embodiment illustrated in FIG. 5, the transverse conduit of the homogenization compartments 60A, 60B runs in a continuous manner around the collectors 2A and 2B and comprises a peripheral leak-tight seal, in such a manner as to avoid any hydrogen fluid flow bypassing the homogenization compartments.

Some particular embodiments have just been described. Several variants and modifications will be apparent to those skilled in the art.

According to one variant, the leak-tight membrane 70A (respectively 70B) may have a plurality of through-orifices, no longer uniformly distributed opposite the longitudinal conduits 61A (respectively 61B), but situated opposite solely the longitudinal conduits 61A (respectively 61B) and distal or far away with respect to the injection conduits 42A (respectively 42B). Thus, the hydrogen passing through the injection conduits 42A (respectively 42B) flows away from these conduits as far as the through-orifices then is preferably introduced into the longitudinal conduits 61A (respectively 61B) situated facing these orifices. In this case, it is advantageous for the bipolar plate 30A (respectively 30B) to also comprise injection conduits 32A (respectively 32B) communicating with the same collector and superposed with the injection conduits 42A (respectively 42B) of the bipolar plate 40A (respectively 40B). Thus, the flow of hydrogen is rendered even more uniform upstream of the homogenization compartment 60A (respectively 60B), a fact which subsequently improves the uniform distribution of the flow of hydrogen at the inlet of the distribution circuit 50A (respectively 50B).

According to another variant, the leak-tight membrane may be replaced by a layer of a porous material designed to ensure the diffusion of the flow of hydrogen in the direction of the longitudinal conduits, in particular of the flow coming from the injection conduits of the bipolar plate 40A, 40B. This porous material may be identical to the material of the diffusion layer (or GDL, for gas diffusion layer) situated between the bipolar plates and the electrochemically active material of the electrode being considered for each cell.

The invention claimed is:

1. A stack of electrochemical cells, comprising:
    the electrochemical cells being divided up into N separate groups of cells, N≥2;
    each electrochemical cell comprising a distribution circuit configured to distribute a reactive species over an electrode of the cell;
    each cell comprising at least two supply collectors, including (i) at least one supply collector comprising open injection conduits opposite an inlet of the distribution circuit and configured to supply flow of the reactive species and (ii) at least one supply collector comprising closed injection conduits opposite the inlet of the distribution circuit and configured not to supply the reactive species,
    wherein each of the electrochemical cells comprises a homogenization compartment facing the at least one supply collector comprising the open injection conduits and facing the at least one supply collector comprising the closed injection conduits on one side and facing the inlet of the distribution circuit on another side such that the flow of the reactive species enters the inlet of the distribution circuit upon leaving the homogenization compartment, the homogenization compartment comprising:
        a plurality of longitudinal conduits, including first longitudinal conduits each configured with a first end having an inlet, each first end facing the at least one supply collector comprising the open injection conduits to receive the flow of the reactive species and including second longitudinal conduits each configured with a second end having an inlet, each second end facing the at least one supply collector comprising the closed injection conduits, each of the plurality of longitudinal conduits extending longitudinally from a corresponding one of the inlets to a corresponding outlet of the respective longitudinal conduit, each outlet being positioned directly adjacent to the inlet of the distribution circuit of the respective cell; and
        a transverse homogenization conduit disposed between the inlets and outlets of each of the plurality of longitudinal conduits and connecting the longitudinal conduits to one another in a fluid sense; and
    the homogenization compartments of the electrochemical cells are superposed onto one another, and identical to one another.

2. The stack of electrochemical cells according to claim 1, wherein an average transverse size of the transverse homogenization conduit of the homogenization compartment is greater than an average transverse size of each of the longitudinal conduits.

3. The stack of electrochemical cells according to claim 1, wherein the longitudinal conduits and the transverse homogenization conduit of the homogenization compartment are tubular members formed in a first bipolar plate of each cell, the tubular members coming out on a main face of the first bipolar plate oriented towards the electrode.

4. The stack of electrochemical cells according to claim 3, wherein the first bipolar plate is formed from two parts assembled to one another, and comprises a first sealing line and a second sealing line locally ensuring leak-tight sealing between the two parts of the first bipolar plate, the first sealing line extending in a continuous manner around the at least one supply collector that does not supply the reactive species, and the second sealing line extending in a continuous manner around all supply collectors and the homogenization compartment.

5. The stack of electrochemical cells according to claim 1, wherein the distribution circuit of each cell comprises a plurality of parallel channels running from the inlet of the distribution circuit, a number of longitudinal conduits being substantially greater than or equal to a number of channels, each longitudinal conduit coming out substantially opposite one or more channels.

6. The stack of electrochemical cells according to claim 1, wherein the at least one supply collector configured to supply the reactive species to a respective cell comprises injection conduits coming out on a main face of a first bipolar plate of the respective cell oriented towards the electrode, a number of longitudinal conduits being greater than a number of injection conduits, each longitudinal conduit coming out substantially opposite one or more injection conduits.

7. The stack of electrochemical cells according to claim 1, wherein the at least one supply collector that does not supply the reactive species to a respective cell comprises the closed injection conduits not coining out on a main face of a first bipolar plate of the respective cell oriented towards the electrode, a number of longitudinal conduits being greater than a number of the closed injection conduits, some of the longitudinal conduits come out substantially opposite a corresponding closed injection conduit.

8. The stack of electrochemical cells according to claim 1, wherein the transverse homogenization conduit of the homogenization compartment runs in a continuous manner around supply collectors on a first bipolar plate of each cell and is assembled in a leak-tight manner to a second bipolar plate of the respective cell.

9. The stack of electrochemical cells according to claim 1, wherein the transverse homogenization conduit of the homogenization compartment has a straight transverse cross-section whose average size increases starting from an edge of the inlet of the distribution circuit.

10. The stack of electrochemical cells according to claim 1, wherein the at least one supply collector that supplies the reactive species to a respective cell comprises injection conduits coming out on a main face of a second bipolar plate of the respective cell, the main face of the second bipolar plate being oriented towards a second electrode separated from the electrode of the respective cell by an electrolytic membrane, and communicating with the longitudinal conduits of the homogenization compartment.

11. The stack of electrochemical cells according to claim 10, wherein, between the injection conduits of the second bipolar plate and the longitudinal conduits, a leak-tight membrane comprising at least one through-orifice is interposed, the at least one through-orifice being disposed opposite at least one longitudinal conduit distal with respect to the injection conduits of the second bipolar plate.

12. The stack of electrochemical cells according to claim 11, wherein the leak-tight membrane comprises a plurality of through-orifices distributed substantially opposite the longitudinal conduits of the homogenization compartment.

13. The stack of electrochemical cells according to claim 10, wherein, between the injection conduits of the second bipolar plate and the longitudinal conduits, a layer of a porous material is interposed that is configured to ensure diffusion of the flow of the reactive species in a direction of the longitudinal conduits.

14. The stack of electrochemical cells according to claim 1, wherein the transverse homogenization conduit connected to the longitudinal conduits in a fluid sense is configured to homogenize the flow of the reactive species across the inlet of the distribution circuit.

15. The stack of electrochemical cells according to claim 1, wherein the inlets of the first longitudinal conduits and the second longitudinal conduits each extend in a same direction from the respective first and second ends.

16. The stack of electrochemical cells according to claim 1, comprising:
a first group of the first ends disposed directly opposite corresponding ones of the open injection conduits,
a second group of the second ends disposed directly opposite the closed injection conduits, and
at least one of:
one first longitudinal conduit disposed between the first group and the second group and having a first end disposed to be not directly opposite one of the open injection conduits, and
one second longitudinal conduit disposed between the first group and the second group and having a second end disposed to be not directly opposite one of the closed injection conduits.

17. A stack of electrochemical cells, comprising:
the electrochemical cells being divided up into N separate groups of cells, N≥2;
each electrochemical cell comprising a distribution circuit configured to distribute a reactive species over an electrode of the cell; and
each cell comprising at least two supply collectors, including (i) at least one supply collector comprising open injection conduits opposite an inlet of the distribution circuit and configured to supply flow of the reactive species and (ii) at least one supply collector comprising closed injection conduits opposite the inlet of the distribution circuit and configured not to supply the reactive species,
wherein each of the electrochemical cells comprises a homogenization compartment facing the at least one supply collector comprising the open injection conduits and facing the at least one supply collector comprising the closed injection conduits on one side and facing the inlet of the distribution circuit on another side such that the reactive species are directed towards the inlet of the distribution circuit upon leaving the homogenization compartment, the homogenization compartment comprising:
a plurality of longitudinal conduits each being open at a first end to receive the reactive species and open at a second end to discharge the reactive species,
the first ends being disposed opposite the open injection conduits and the closed injection conduits,
the second ends being disposed opposite the inlet of the distribution circuit of the respective cell,
each of the plurality of longitudinal conduits extending longitudinally from a corresponding one of the first ends to a corresponding one of the second ends, and
a transverse homogenization conduit section disposed between the first and second ends of each of the plurality of longitudinal conduits and connecting the longitudinal conduits to one another in a fluid sense.

18. The stack of electrochemical cells according to claim 17, wherein the longitudinal conduits are arranged to each extend in a same direction from a corresponding one of the first ends to a corresponding one of the second ends.

19. The stack of electrochemical cells according to claim 17, comprising:
each of the longitudinal conduits having a same configuration, and
the longitudinal conduits being arranged parallel to one another.

20. The stack of electrochemical cells according to claim 17, comprising:
a first group of the first ends disposed directly opposite the open injection conduits
a second group of the first ends disposed directly opposite the closed injection conduits, and at least one first end disposed between the first group and the second group and disposed to be not directly opposite either one of the open injection conduits or one of the closed injection conduits.

* * * * *